(12) United States Patent
Schlickum

(10) Patent No.: US 8,128,855 B2
(45) Date of Patent: Mar. 6, 2012

(54) METHOD FOR PRODUCING A CONDENSER

(75) Inventor: Till Schlickum, Kiel (DE)

(73) Assignee: Terrawater GmbH, Kiel (DE)

( * ) Notice: Subject to any disclaimer, the term of this patent is extended or adjusted under 35 U.S.C. 154(b) by 0 days.

(21) Appl. No.: 12/922,356

(22) PCT Filed: Mar. 14, 2009

(86) PCT No.: PCT/DE2009/000356
§ 371 (c)(1),
(2), (4) Date: Sep. 13, 2010

(87) PCT Pub. No.: WO2009/121320
PCT Pub. Date: Oct. 8, 2009

(65) Prior Publication Data
US 2011/0006455 A1 Jan. 13, 2011

(30) Foreign Application Priority Data
Apr. 2, 2008 (DE) .......................... 10 2008 016 809

(51) Int. Cl.
B29C 39/10 (2006.01)
(52) U.S. Cl. .................... 264/261; 264/275; 264/277
(58) Field of Classification Search .................. None
See application file for complete search history.

(56) References Cited

U.S. PATENT DOCUMENTS

| 3,422,884 A | * | 1/1969 | Otten ............................. 165/67 |
| 3,643,805 A | * | 2/1972 | Hoffman .................. 210/321.87 |
| 3,697,635 A | | 10/1972 | Dietzsch et al. |
| 4,312,687 A | * | 1/1982 | Sigworth, Jr. .................. 156/245 |
| 4,902,419 A | * | 2/1990 | Shibata et al. ........... 210/321.89 |
| 5,266,262 A | * | 11/1993 | Narayama et al. ............ 264/513 |
| 5,865,244 A | | 2/1999 | Moser |
| 6,180,038 B1 | * | 1/2001 | Cesaroni ....................... 264/135 |

FOREIGN PATENT DOCUMENTS

| DE | 3152899 | | 8/1983 |
| FR | 2267868 | * | 12/1975 |
| GB | 1040284 | | 8/1966 |
| TW | 481756 | * | 4/2002 |

* cited by examiner

Primary Examiner — Edmund H. Lee
(74) Attorney, Agent, or Firm — Diederiks & Whitelaw, PLC

(57) ABSTRACT

Method for producing a condenser, which is provided with a plurality of pipes extending parallel to each other and disposed in a specified grid, the ends of the pipes being held by a base plate, characterized by the following sequential method steps: providing a pan, the base surface of which has a plurality of bores disposed in a defined grid and pipe sockets aligned with the bores, introducing filling pins into the pipe sockets, introducing thermoplastic granules into the pan, melting the granules in the pan, introducing centering pins into the pipe sockets while pushing out the filling pins, sliding the pan comprising the molten granules onto the free ends of the pipes, cooling the molten granules while forming a base plate receiving the free ends of the pipes in a gas-tight manner, the base plate being made of thermoplastic material, and subsequently pulling the pan and the centering pins off the connection of the base plate and pipes.

4 Claims, 1 Drawing Sheet

METHOD FOR PRODUCING A CONDENSER

CROSS-REFERENCE TO RELATED APPLICATIONS

This application represents a National Stage application of PCT/DE2009/000356 entitled "Method for Producing a Condenser" filed Mar. 14, 2009, pending.

BACKGROUND OF THE INVENTION

The invention relates to a method for producing a condenser, which is provided with a plurality of pipes extending parallel to each other and disposed in a defined grid, the ends of said pipes being held by a base plate.

Such condensers are for example used for water treatment plants where a multiplicity of pipes are provided that extend parallel to each other, are flown around by a carrier gas laden with moisture and that carry a coolant.

Producing such condensers is problematic because the problem presents itself that the free ends of pipes have to be combined in each case by a base plate.

SUMMARY OF THE INVENTION

The invention is based on the object of creating a method for producing such a condenser that enables the free ends of the pipes to be connected to a base plate in a simple way.

BRIEF DESCRIPTION OF THE DRAWINGS

The invention is explained below with reference to a drawing that illustrates the different elements used with the method, FIG. 1 showing an elevation of these elements and FIG. 2 a perspective view.

DETAILED DESCRITPION OF THE INVENTION

Figures 1, 2:
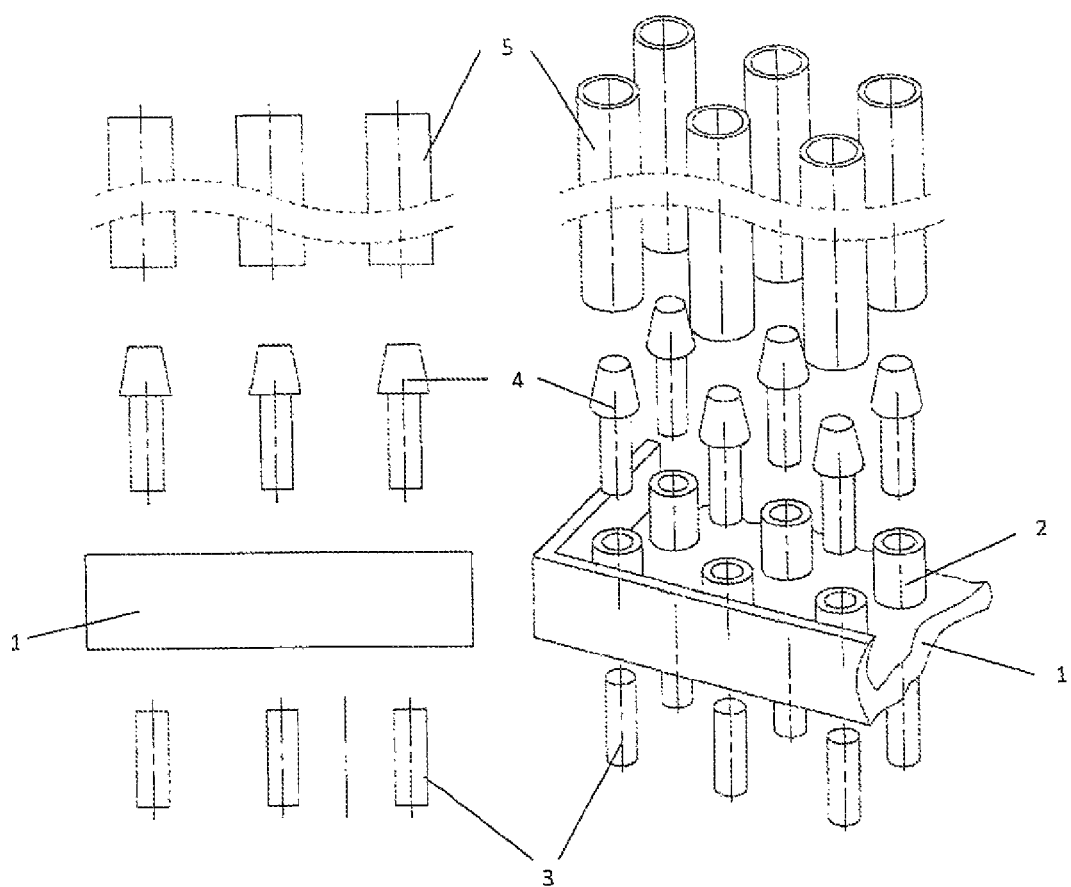

A pan 1 is provided, the base surface of which has a plurality of bores disposed in that grid in which the pipes are arranged. The bores too are arranged with these pipe sockets 2 such that their faces pointing upward are aligned with each other. The outer diameter of these pipe sockets 2 corresponds to the inner diameter of the pipes. Then filling pins 3 whose outer diameter corresponds to the inner diameter of the pipe sockets 2 are introduced. Then thermoplastic granules are filled into the pan 1 and melted.

After melting the granules a mold die can be placed thereon until it rests on the free faces of the pipe sockets 2. This mold die on the one hand has the meaning that it compresses the molten granules, on the other hand it takes care of removing excess material.

Centering pins 4 are then introduced from above into the pipe sockets 2 while pushing out the filling pins 3, the outer diameter of the shaft of the centering pins corresponding to the inner diameter of the pipe sockets 2 and a frusto-conical centering section corresponding to the inner diameter of the pipes.

The pan 1 with the molten granules and the centering pins 4 is then slid onto the free ends of the pipes 5, the frusto-conical centering sections of the centering pins 4 entering into the free ends of the pipes 5. Here the centering sections are preferably formed from a plastic, preferably Teflon, so that the inner diameter of the pipes does not fusion-bond.

This unit can then cool, the molten granules then forming a base plate that sealingly receives the free ends of the pipes 5. After pulling the pan 1 and the centering pins 4 off the base plate that is firmly connected to the pipes 5, the same procedure can be carried out with the other free ends of the pipes, thus producing the condenser.

The invention claimed is:

1. Method for producing a condenser, which is provided with a plurality of pipes extending parallel to each other and disposed in a specified grid, with ends of said pipes being held by a base plate, characterized by the following sequential method steps:

providing a pan having a base surface provided with a plurality of bores disposed in a defined grid and pipe sockets aligned with the bores, introducing filling pins into the pipe sockets, introducing granules of thermoplastic material into the pan, melting the granules in the pan to establish molten granules, introducing centering pins into the pipe sockets while pushing out the filling pins, sliding the pan, including the molten granules, onto free ends of the pipes, cooling the molten granules to form a base plate receiving the free ends of the pipes in a gas-tight manner, said base plate being made of the thermoplastic material of the granules, and subsequently pulling the pan and the centering pins off a connection of the base plate and pipes.

2. The method according to claim 1, characterized by applying a mold die onto free faces of the pipe sockets after melting the granules in the pan so as to compress the molten granules and remove excess molten granules material.

3. A method for producing a condenser comprising:

providing a pan having a base surface provided with a plurality of bores disposed in a defined grid and pipe sockets aligned with the bores;

introducing filling pins into the pipe sockets;

introducing granules of thermoplastic material into the pan;

melting the granules in the pan to establish molten granules;

introducing centering pins into the pipe sockets while pushing out the filling pins;

sliding the pan, including the molten granules, onto free ends of the pipes;

cooling the molten granules to form a base plate receiving the free ends of the pipes in a gas-tight manner, said base plate being made of the thermoplastic material of the granules; and subsequently removing the pan and the centering pins, leaving the pipes extending substantially parallel to each other, held by the base plate and disposed in the defined grid.

4. The method according to claim 3, further comprising: applying a mold die onto free faces of the pipe sockets after melting the granules in the pan so as to compress the molten granules and remove excess molten granules material in forming the base plate.

\* \* \* \* \*